United States Patent [19]
Murase

[11] Patent Number: 4,864,431
[45] Date of Patent: Sep. 5, 1989

[54] TAPE DUBBING APPARATUS IN WHICH EACH OF A PLURALITY OF SLAVE RECORDERS IS OPERATED IN SYNCHRONISM WITH A MASTER PLAYER

[75] Inventor: Hirofumi Murase, Kanagawa, Japan

[73] Assignee: Sony Corp., Tokyo, Japan

[21] Appl. No.: 225,810

[22] Filed: Jul. 29, 1988

[30] Foreign Application Priority Data

Aug. 19, 1987 [JP] Japan .................. 62-206025

[51] Int. Cl.⁴ .................. G11B 5/86; G11B 15/14
[52] U.S. Cl. .................. 360/15; 360/64
[58] Field of Search .................. 360/15, 51, 73, 64

[56] References Cited

U.S. PATENT DOCUMENTS

| | | | |
|---|---|---|---|
| 3,875,588 | 4/1975 | Bennett | 360/15 |
| 4,375,655 | 3/1983 | Korth et al. | 360/15 |
| 4,410,917 | 10/1983 | Newdoll et al. | 360/15 |
| 4,446,494 | 5/1984 | Stockham, Jr. et al. | 360/73 |
| 4,618,897 | 10/1986 | Johnson et al. | 360/15 |
| 4,727,509 | 2/1988 | Johnson et al. | 360/15 |

FOREIGN PATENT DOCUMENTS 0195773 10/1985 Japan .

OTHER PUBLICATIONS

Brock, R. L. Patent Associated Literature, IBM TDB, vol. 19, No. 1, pp. 296-297, Jun. 1976.

Primary Examiner—Vincent P. Canney
Assistant Examiner—Surinder Sachar
Attorney, Agent, or Firm—Alvin Sinderbrand, Curtis, Morris & Stafford

[57] ABSTRACT

In a magnetic tape recording system having a single master tape player and a plurality of slave recording devices each including at least one rotary magnetic head for repeatedly scanning a respective magnetic recording tape, and each receiving, from the single master tape player, a signal to be recorded along with an external sync or reference signal; each of the slave recording devices is provided with a respective time base adjusting memory in which the signal to be recorded is written in synchronism with the external reference signal, and from which the signal to be recorded is read-out in synchronism with a reference pulse generated in timed relation to a predetermined rotational position of the respective rotary magnetic head. Further, a drum servo is provided in each of the slave recording devices for controlling the rotation of the respective rotary magnetic head in accordance with the relation of the respective reference pulse in respect to the external reference signal from the single master player, whereby the several slave recording devices are operated in substantial synchronism with each other and alignment errors in the patterns of slant record tracks on the several magnetic tapes can be prevented.

10 Claims, 3 Drawing Sheets

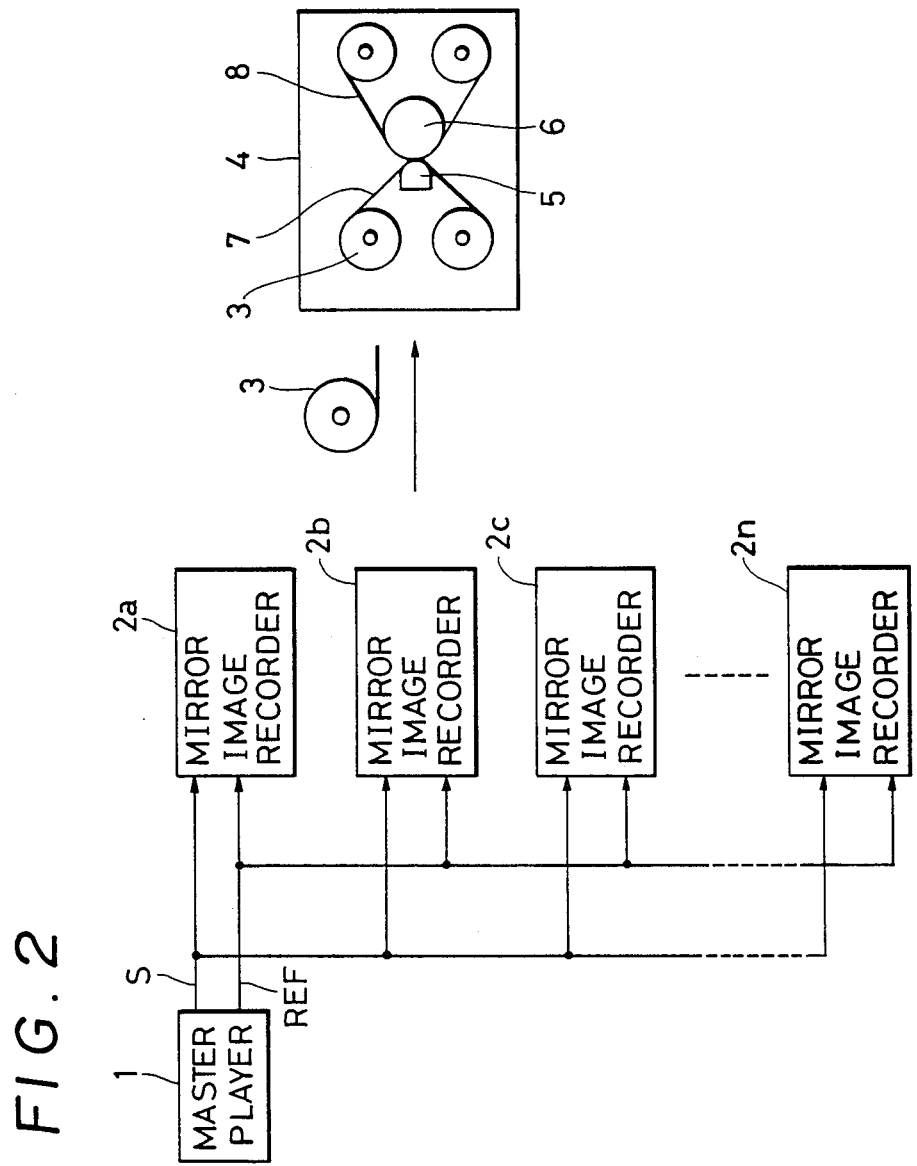

FIG. 3A
REF — 200μsec
FIG. 3B
INPUT DATA S — A-ch | B-ch
FIG. 3C
PG
|← 400μ sec →|
FIG. 3D
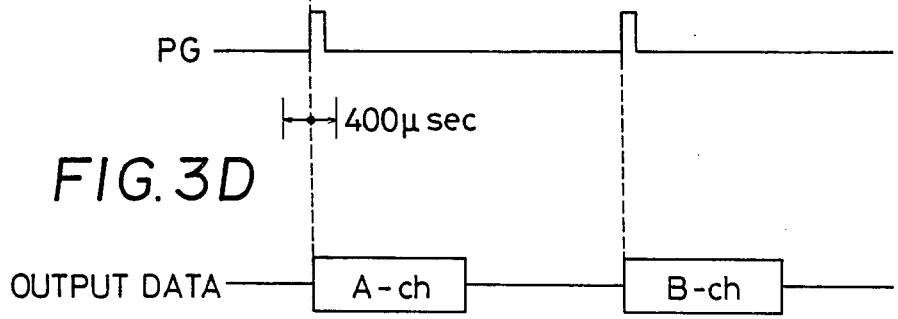
OUTPUT DATA — A-ch | B-ch
FIG. 4A
PRIOR ART
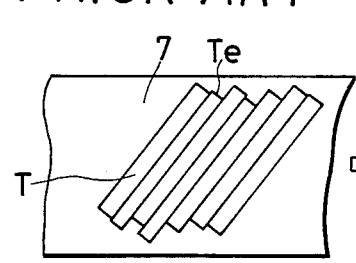
FIG. 4B
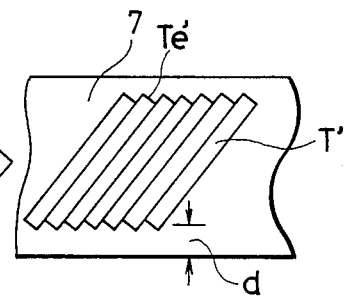

TAPE DUBBING APPARATUS IN WHICH EACH OF A PLURALITY OF SLAVE RECORDERS IS OPERATED IN SYNCHRONISM WITH A MASTER PLAYER

BACKGROUND OF THE INVENTION

1. Field of the Invention

This invention relates generally to a signal recording apparatus having at least one rotary magnetic head, and more particularly is directed to a signal recording apparatus particularly suited to serve as a slave recording device in a magnetic tape recording system of the type that employs a single master tape player providing a signal to be simultaneously recorded on a plurality of magnetic record tapes by a plurality of slave recording devices.

2. Description of the Prior Art

When it is desired to provide a number of copies of a magnetic tape having video, audio or other information signals recorded in slant tracks thereon, the signal to be recorded is reproduced by a master tape player and supplied simultaneously to a plurality of slave recording devices in which copying in real time is effected. The foregoing procedure is quite obviously costly and time consuming in that a period of time equal to the duration of the original recording is required for producing each copy thereof. In a magnetic transfer-type copying system, high-speed dubbing can be performed, for example, at a speed 120 times the ordinary recording speed. In such case, in an intermediate stage of the process, it is necessary to form mirror images of the original track pattern on blank tapes, and for this purpose a plurality of mirror image slave recorders are connected to a single master player, and simultaneous recording is performed in real time in order to obtain a plurality of mirror image tapes which can each be used in the magnetic transfer-type copying or dubbing system. A mirror image recorder of the foregoing type is known, for example, as disclosed in Japanese Patent Publication No. 48-30886, or in U.S. Pat. No. 3,592,977.

However, when a plurality of slave recorders, such as, the above mentioned mirror image recorders, are operated simultaneously, it is difficult to achieve precise synchronization of the slave recorders with the master player. More specifically, even when the master player and the slave recorders are operated in response to a common sync or external reference signal, the individual slave recorders have a jitter or residual servo error inherent in the respective rotary head servo systems. By reason of such jitter or residual servo error in the rotary head servo system of a slave recorder, the end edges $T_e$ of the successive slant tracks T in which the signal is recorded on the magnetic tape 7 are not properly aligned, that is, the end edges $T_e$ are not uniformly spaced from the side edge of the tape, but rather are irregularly stepped as shown in FIG. 4A. When a mirror image tape having improperly aligned track patterns, as in FIG. 4A, is employed in a magnetic transfer-type copying system providing high-speed dubbing, the resulting copy tape sometimes cannot be reproduced or played back, especially when digital data, such as, digital audio signals, are used as the source of the signals recorded in the slant tracks on the tape.

When only a single slave recorder is connected to a master player a reference pulse provided by a reference pulse generator so as to represent the rotational phase of the rotary magnetic head of the single slave recorder is fed back to the master player, and the supplying of the data or signal to be recorded from the master player to the slave recorder is effected in synchronism with such reference pulse. In other word,, in the case of a single slave recorder associated with a master player, the rotary magnetic head of the master player can be maintained precisely in a predetermined phase relation to the rotary magnetic head of the single slave recorder so that the end edges of the slant tracks recorded by the slave recorder can be maintained in alignment, that is, uniformly stepped in succession. However, when a plurality of slave recorders are connected to a single master player, there may be phase differences between the reference pulses generated by the several slave recorders, by reason of the previously mentioned jitter or residual servo error inherent in each of the slave recorders, with the result that it is difficult to achieve the precise synchronization of the single master player with all of the plurality of slave recorders.

OBJECTS AND SUMMARY OF THE INVENTION

Accordingly, it is an object of this invention to provide a signal recording apparatus which avoids the foregoing problems.

More specifically, it is an object of this invention to provide a signal recording apparatus capable of forming uniform track patterns on a magnetic tape even when such apparatus is employed as one of several slave recorders associated with a single master player in a magnetic tape recording system.

In accordance with an aspect of this invention, a signal recording apparatus which receives a signal to be recorded along with an external reference signal in a predetermined time relation to the signal to be recorded is provided with at least one rotary magnetic head for repeatedly scanning a magnetic recording tape, a head drive motor for rotating the magnetic head at a predetermined speed, a reference pulse generator for generating a reference pulse in timed relation to a predetermined rotational position of the rotary magnetic head, a drum servo for controlling the rotation of the head drive motor in accordance with the relation of the reference pulse to the external reference signal, memory means, such as, a buffer memory, for temporarily storing the signal to be recorded, and control means connected with the memory means for timing read-out of the signal to be recorded from the memory means to the rotary magnetic head in accordance with the reference pulse. By reason of the foregoing arrangement, the time base of a signal to be recorded is corrected to match the rotational phase of the corresponding rotary magnetic head. Therefore, even if the drum servo of the individual rotary head has an inherent jitter, that defect is individually corrected so that the recording in each slant track on a tape is started at a predetermined distance from the side edge of the tape, and which corresponds to the timed relation between the reference pulse and the predetermined rotational position of the rotary magnetic head. As a result of the foregoing, a plurality of slave recorders each embodying the above described arrangement can be associated with a single master player with the assurance that the respective rotary heads will operate substantially synchronously, and that the resulting relatively large number of copy tapes will be obtained with uniform track patterns.

The above, and other objects, features and advantages of the invention, will be apparent in the following detailed description of a preferred embodiment which is to be read in connection with the accompanying drawings, wherein corresponding parts or elements are identified by the same reference numerals in the several views.

BRIEF DESCRIPTION OF THE DRAWINGS

FIG. 2 is a block diagram of a magnetic transfer-type copying or dubbing system employing a plurality of mirror image recorders according to the embodiment of the present invention shown on FIG. 1;

FIGS. 3A to 3D are timing charts to which reference will be made in expaining the operation of the recorder shown on FIG. 1; and FIGS. 4A and 4B show track patterns formed on a magnetic tape in a magnetic transfer-type copying system using mirror image slave recorders according to the prior art and according to the present invention, respectively.

DETAILED DESCRIPTION OF A PREFERRED EMBODIMENT

Figure 1:
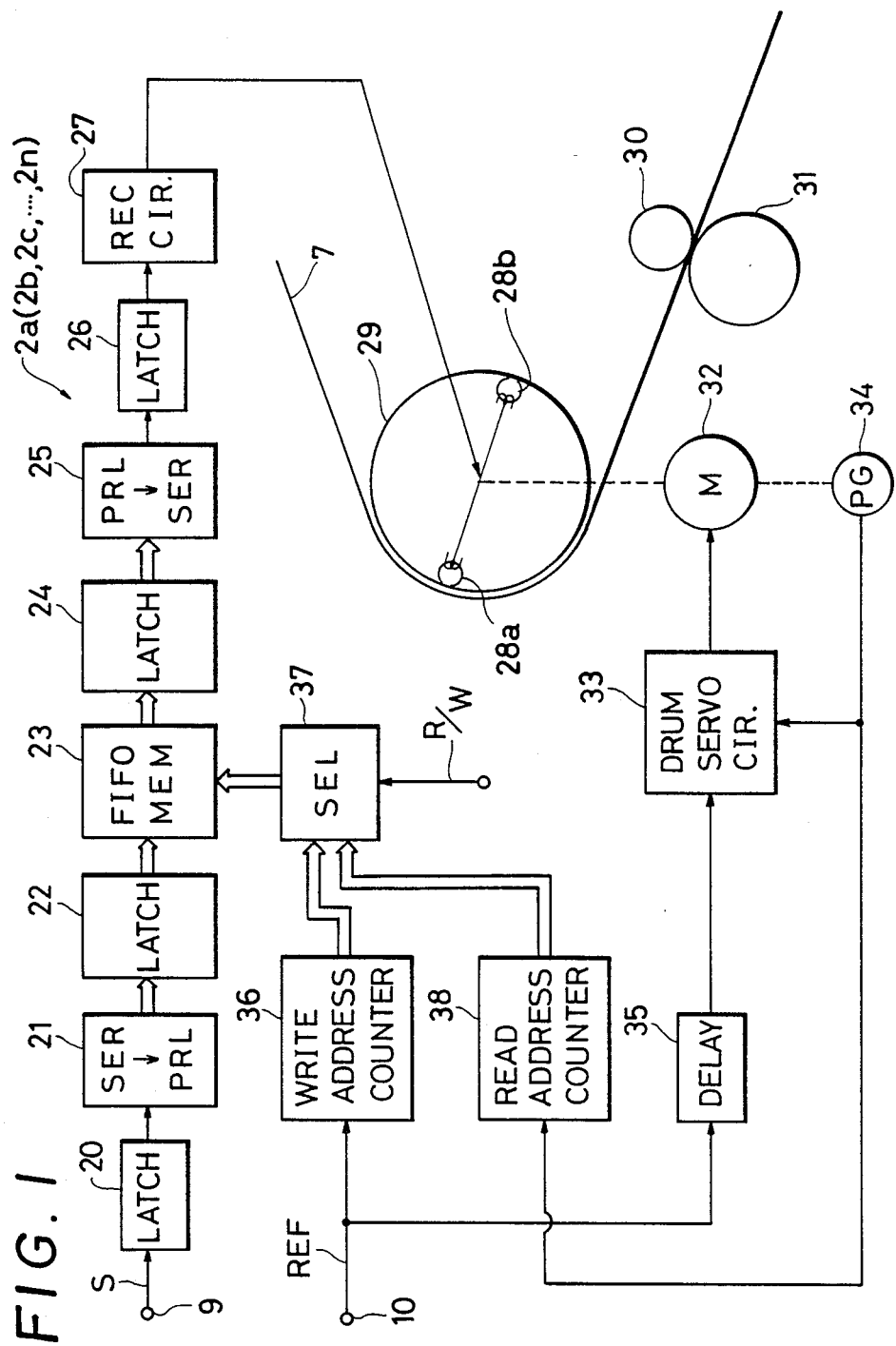
FIG. 1 is a block diagram of a mirror image recorder according to an embodiment of the present invention, and which shows only those components of the recorder necessary to an understanding of the present invention.

Referring initially to FIG. 2, it will be seen that, in a magnetic transfer-type copying or dubbing system in which the present invention may be advantageously employed, a single master player 1, for example, a rotary head-type digital audio recorder, reproduces digital data S from a master tape in the master player 1, and such reproduced digital data S is commonly supplied to a plurality of mirror image recorders 2a, 2b, 2c, - - - 2n for recording by the latter on respective mirror mother tapes each having a track pattern which is a mirror image of the track pattern on the master tape in player 1. An external sync or reference signal REF is also supplied from the master player 1 to the mirror image recorders 2a, 2b, 2c, - - - 2n, in parallel with each other for operating the master player 1 and the mirror image recorders 2a, 2b, 2c, - - - 2n substantially in synchronism with each other. A tape reel 3, on which there is wound a mirror mother tape 7 recorded in one of the mirror image recorders 2a, 2b, 2c, — 2n, is loaded into a known magnetic transfer-type contact printer 4. As shown in simplified illustration of FIG. 2, the magnetic transfer-type contact printer 4 includes a bias head 5 and a transfer drum 6 in substantially close contact with each other, and between which the mirror mother tape 7 and a blank tape 8 are driven together so as to effect magnetic transfer of the recorded signal from the mirror mother tape 7 to the blank tape 8. In an actual magnetic transfer-type copying system, a plurality of contact printers, each generally corresponding to the described contact printer 4, are used in association with mirror mother tapes recorded in the several mirror image recorders 2a, 2b, 2c, - - - 2n, so as to simultaneously obtain copy tapes from the respective contact printers 4.

Referring now to FIG. 1, it will be seen that each of the mirror image slave recorders 2a, 2b, 2c, - - - 2n provided in accordance with an embodiment of this invention in the system of FIG. 2 includes input terminals 9 and 10 which respectively receive digital data S reproduced from a master tape in the single master player 1, and an external sync or reference signal REF, also from the single master player 1. The external sync or reference signal REF (FIG. 3A) is in a predetermined timed relation or synchronism with the alternating channel data A-ch and B-ch (FIG. 3B) of the digital signal S to be recorded.

The digital data S to be recorded is supplied from the input terminal 9 through a latch circuit 20, a serial-to-parallel converter 21 and a latch circuit 22 to a buffer memory 23 provided, in accordance with this invention, for adjusting the time base of the signal to be recorded in order to cancel or compensate for any jitter, drift or residual error of the drum servo system of the respective mirror image slave recorder. The memory 23 is desirably a FIFO (first-in-first-out)—type memory capable of simultaneously performing writing and reading in an asynchronous manner. The data read-out of the memory 23 is supplied for recording through a latch circuit 24, a parallel-to-serial converter 25 and a latch circuit 26 to a recording circuit 27. The signal to be recorded is supplied from the output of the recording circuit 27 to rotary magnetic heads 28a and 28b mounted on a rotary drum 29 about which the respective magnetic tape 7 is wrapped helically. The type 7 is driven longitudinally at a constant speed by a capstan 30 and pinch roller 31 in a conventional manner so that the signal S supplied from the master player 1 will be recorded on the magnetic tape 7 in a mirror image track pattern.

The drum 29 and the rotary magnetic heads 28a and 28b thereon are rotated by a head or drum drive motor 32 which is phase-controlled by a drum servo circuit 33. The drum servo circuit 33 receives a reference pulse PG (FIG. 3C) from a pulse generator 34 which is coupled with the head drive motor 32, and hence with the drum 29 carrying the heads 28a and 28b so that the reference pulse PG is in a suitably timed relation to a predetermined rotational position of each of the heads 28a and 28b. In other words, the reference pulse PG indicates the rotational phase of the heads 28a and 28b. The drum servo circuit 33 further receives the external sync or reference signal REF through a delay circuit 35 which provides a suitable delay, as hereinafter described in detail. The drum servo circuit 33 controls the head drive motor 32 in the sense for bringing the reference pulse PG from generator 34 into phase or synchronism with the delayed external reference signal REF from the delay circuit 35.

The drum servo circuit 33 provides a servo system having a possible jitter of the order of several tens $\mu$ sec. However, the memory 23 is desirably provided with a capacity of $\pm 200\mu$ sec., that is, a capacity of $400\mu$ sec., in consideration of the drift that may result from variation in the drum rotating load due to changes in humidity and temperature. Further, it may be noted that the standard data transmission rate for rotary head-type digital audio tape recorders is about 2.46 MB/S (megabits per second).

A write address signal for the memory 23 is generated by a write address counter 36 in synchronism with the external sync or reference signal REF from the master player 1 and is supplied to the memory 23 through a write channel of an address selector 37 under the control of a read/write signal R/W. Since the writing in the memory 23 of each of the mirror image slave recorders 2a, 2b, 2c - - - 2n is, in accordance with this invention, timed in relation to the external sync or reference signal REF from the single master player 1, it will be appreciated that a single write address counter 36 can be provided in common for all of the mirror image slave recorders.

A read address signal for the memory 23 in each of the slave recorders 2a, 2b, 2c, - - - 2n is generated by a read address counter 38 in synchronism with the reference pulse PG supplied by the generator 34, and which exhibits the rotational phase of the rotary heads 28a and 28b. Therefore, writing in the memory 23 of each of the slave recorders is in synchronism with the external reference signal REF (FIG. 3A) from the single master player 1, and hence also in synchronism with alternating A/B-channel input data S (FIG. 3B), whereas, the read-out of data (FIG. 3D) from the memory 23 in each slave recorder is synchronized with the reference pulse PG (FIG. 3C) generated in the respective slave recorder.

By reason of the foregoing, recording of the signal S in each of the slant tracks scanned by the rotary heads 28a and 28b across the tape 7 begins at a time when the respective head is at a precisely predetermined position, for example, at the distance d (FIG. 4B) from the adjacent side edge of the tape 7. As a result, even when there is a jitter in the drum servo circuit 33 or a drift occurs in the rotational phase of the heads 28a and 28b, the respective mirror image slave recorder consistently provides a uniform recording pattern of the slant tracks T' in which the end edges T'e of the tracks are uniformly aligned or stepped, as shown on FIG. 4B.

As earlier noted, the external sync or reference signal REF is supplied to the servo circuit 33 through a delay circuit 35. In the example being described, the circuit 35 provides a delay of about 200 sec. so that the reference pulse PG from the generator 34 is delayed by about 200 sec. from the leading edge of the external reference signal REF as received at the input terminal 10 from the master player 1, as is apparent from a comparison of FIGS. 3A and 3C. This delay time is one half the maximum hold time (400 sec.) of the memory 23. Therefore, when the reference pulse PG varies within the range of ±200 sec. because of jitter or drift, the write/read operations of the memory 23 can be performed without data omissions by following such variation in the reference pulse PG, with the result that even substantial jitter or drift is reliably cancelled.

In the above, reference has been made to the application of the invention to a mirrorimage recorder. However, it will be appreciated that the invention may be similarly applied to an ordinary dubbing system employing a master player and a plurality of ordinary slave recorders which each provide an exact copy rather than a mirror image of the original recording. Further, in the described embodiment of the invention, a digital signal is the original signal to be recorded. However, analog signals may be similarly recorded, for example, by adding an analog-to-digital converter in advance of the latch circuit 20 and by adding a digital-to-analog converter after the latch circuit 26.

By way of summary, in accordance with the present invention, by providing each of the slave recorders with a memory in which the signal to be recorded is written in synchronism with the external sync or reference signal from the master player, while the read-out of the signal from the memory is synchronized with the rotational phase of the rotary head of the corresponding slave recorder, jitter and drift of the respective drum servo can be cancelled. As a result, uniformly aligned track patterns can be simply and reliably obtained on each copy tape. Furthermore, the memory provided in each slave recorder can have a relatively small capacity sufficient for cancelling rotational jitter, whereby the advantages of the invention can be attained without unduly increasing the cost.

Although a preferred embodiment of the invention has been described in detail herein with reference to the accompanying drawings, it is to be understood that the invention is not limited to that precise embodiment, and that various changes and modifications can be effected therein by one skilled in the art without departing from the scope or spirit of the invention as defined in the appended claims.

What is claimed is:

1. A signal recording apparatus comprising:
   input means for receiving a signal to be recorded along with an external reference signal in a predetermined timed relation to said signal to be recorded;
   at least one rotary magnetic head for repeatedly scanning a magnetic recording tape as the latter is advanced so that said head scans successive tracks extending obliquely across the tape;
   a head drive motor coupled to said rotary magnetic head for rotating the magnetic head at a predetermined speed;
   a reference pulse generator for generating a reference pulse in timed relation to a predetermined rotational position of said rotary magnetic head and hence in relation to the commencement of each scan of a track by said head;
   drum servo means for controlling the rotation of said head drive motor in accordance with the relation of said reference pulse to said external reference signal;
   memory means for temporarily storing said signal to be recorded; and
   control means connected with said memory means for timing read-out of said signal to be recorded from said memory means to said rotary magnetic head in accordance with said reference pulse so as to ensure uniform alignment of the signal as recorded in all of said tracks.

2. A signal recording apparatus according to claim 1; in which said memory means is a FIFO-type memory; and further comprising means for timing writing in said FIFO-type memory of said signal to be recorded independently of said read-out from the FIFO-type memory.

3. A signal recording apparatus according to claim 2; in which said means for timing writing of said signal to be recorded in said FIFO-type memory operates in accordance with said external reference signal.

4. A signal recording apparatus according to claim 2; further comprising delay means through which said external reference signal is supplied to said drum servo means; and in which said drum servo means controls said head drive motor in the sense to bring said reference pulse into synchronism with the delayed external reference signal.

5. A magnetic tape recording system comprising:
   a single master tape player providing a signal to be recorded and an external reference signal in a predetermined timed relation to said signal to be recorded; and
   a plurality of slave recording devices receiving said signal to be recorded and said external reference signal from said single master tape player and each including at least one rotary magnetic head for repeatedly scanning a magnetic recording tape as the latter is advanced so that said head scans successive tracks extending obliquely across the tape, a head drive motor coupled to said rotary magnetic head for rotating the latter substantially at a predetermined speed, a reference pulse generator for generating a reference pulse in timed relation to a predetermined rotational position of said rotary magnetic head and hence in relation to the commencement of each scan of a track by said head, drum servo means for controlling the rotation of said reference pulse from the respective reference pulse generator in respect to said external reference signal from the single master tape player, memory means for temporarily storing said signal to be recorded on the respective magnetic recording tape, and control means connected with said memory means for timing read-out of said signal to be recorded from the respective memory means to said rotary magnetic head in accordance with said reference pulse from the respective reference pulse generator so as to ensure uniform alignment of the signal as recorded in all of said tracks by all of said slave recording devices.

6. A magnetic tape recording system according to claim 5; in which said memory means of each of said slave recording devices is a FIFO-type memory; and in which each of said slave recording devices further includes means for timing writing in the respective FIFO-type memory of said signal to be recorded independently of said read-out from the FIFO-type memory.

7. A magnetic tape recording system according to claim 6; in which said means for timing writing of said signal to be recorded in said FIFO-type memory of each of said slave recording devices operates in accordance with said external reference signal from said single master tape player.

8. A magnetic tape recording system according to claim 6; in which each of said slave recording devices further includes delay means through which said external reference signal is supplied to the respective drum servo means, and said drum servo means controls the respective head drive motor in the sense to bring said reference pulse from the respective reference pulse generator into synchronism with the delayed external reference signal.

9. A magnetic tape recording system according to claim 8; in which said memory means has a predetermined capacity, and said delay means provides a delay of said external reference signal which corresponds to approximately one-half of said capacity of the memory means.

10. A magnetic tape recording system according to claim 5; in which said memory means of each of said slave recording devices is a FIFO-type memory; and in which said slave recording devices have means in common for timing writing in the respective FIFO-type memories of said signal to be recorded independently of the read-out from said memories.

* * * * *